(12) United States Patent
Keeley et al.

(10) Patent No.: US 8,356,990 B2
(45) Date of Patent: Jan. 22, 2013

(54) TOGGLE DRIVE SYSTEM FOR DRIVING IN A THERMOFORMING PRESS

(76) Inventors: Brian Keeley, Beaverton, MI (US);
Albert Arends, Gladwin, MI (US);
James Martin, Beaverton, MI (US);
James Robbins, Midland, MI (US)

( * ) Notice: Subject to any disclaimer, the term of this patent is extended or adjusted under 35 U.S.C. 154(b) by 366 days.

(21) Appl. No.: 12/770,203

(22) Filed: Apr. 29, 2010

(65) Prior Publication Data
US 2010/0278957 A1 Nov. 4, 2010

Related U.S. Application Data

(60) Provisional application No. 61/215,276, filed on May 1, 2009.

(51) Int. Cl.
*B29C 51/38* (2006.01)
(52) U.S. Cl. ..................... 425/451.6; 100/286
(58) Field of Classification Search ............... 425/451.6; 100/264, 281, 286
See application file for complete search history.

(56) References Cited

U.S. PATENT DOCUMENTS

| | | | |
|---|---|---|---|
| 3,504,403 A * | 4/1970 | Brown et al. ............... | 425/451.6 |
| 4,377,377 A * | 3/1983 | Arends et al. ................. | 425/394 |
| 6,200,122 B1 * | 3/2001 | Chun et al. ................. | 425/451.6 |
| 7,510,389 B2 * | 3/2009 | Schroder .................... | 425/451.6 |

* cited by examiner

*Primary Examiner* — James Mackey
(74) *Attorney, Agent, or Firm* — John R. Benefiel

(57) ABSTRACT

A drive system for double toggle mechanisms used to move upper and lower platens with an electric servo motor-gear box drive shaft driving a crank arm arranged to drive a respective double toggle mechanism in turn connected to the platen. The drive shaft axis is located below the toggle mechanism link pivots and driven in a direction so that the motor acts to assist the double toggle mechanism in lifting the platen, reducing the servo motor peak load. The various components are arranged for symmetrical loading of the pivots concerning the toggle links to increase the evenness of the platen when being raised or lowered.

5 Claims, 5 Drawing Sheets

US 8,356,990 B2

TOGGLE DRIVE SYSTEM FOR DRIVING IN A THERMOFORMING PRESS

CROSS REFERENCE TO RELATED APPLICATIONS

This application claims the benefit of U.S. provisional patent application 61/215,276 filed on May 1, 2009.

BACKGROUND OF THE INVENTION

The present invention concerns a system for driving a pair of double toggle mechanisms arranged extending along the front and backside of each of upper and lower platens in a thermoformer press forming station, the system featuring increased platen stability and also a decreased motor load in the midrange of the toggle motion.

Pairs of double toggle mechanisms have heretofore been known to be used to drive press platens operated by one or more motors driving a crank which drives two double toggle mechanisms. Each double toggle mechanism comprises one pair of links connected at one end to a platen and at their other ends are pivoted to one end of a second pair of links which are pivoted to the machine frame. A connector link connects the pivoted connections of the links together, and a crank driven drive link each connected to one end of a connector link operates each toggle mechanism.

The previous arrangements used resulted in an unstable platen motion which could tilt slightly particularly when under heavy load clue to unbalanced forces applied to the toggle mechanisms and twisting at the connections to the crank drive shaft, and pivotal connections with the various links as well as other components.

It is an object of the present invention to improve the crank drive and the various connections between the other components to create symmetrical loading and stable movement of the platens.

In conventional double toggle mechanisms used to drive platens in such presses, the maximum force exerted on the platens occur at full advance to carry out a forming process. Electric servo motors have been used to operate the double toggle mechanisms, which mechanisms develop a very high mechanical advantage when approaching full stroke to thereby generate the high forces necessary for carrying out the forming process. However, the maximum motor load typically occurs appropriately midrange in the toggle mechanism motion since the considerable weight of the platens and molds must be lifted without much benefit from the mechanical advantage afforded by the toggle mechanisms. This is because the toggle mechanisms only develop a modest mechanical advantage at that point in the toggle mechanism motion. A lower power motor could be used if the motor load were reduced at that point.

It is another object of the present invention to arrange the electric motor-crank drive to the toggle mechanism so as to reduce the peak motor load of the drive motor to allow a reduction in the size of the servo motor required to drive the toggle mechanisms.

SUMMARY OF THE INVENTION

These objects and other objects of the present invention which will be understood by those skilled in the art upon a reading of the specification and claims are achieved by a drive for a double toggle mechanisms including a separate crank drive for each toggle mechanism at either end of a crank drive shaft projecting out opposite ends of a gear box output tube driven by an electric motor. The crank drive shaft has a crank arm attached at either end which drives a drive link pivotally connected to a respective double toggle mechanism.

An important aspect of the invention is that the crank arms and drive shaft axis for the double toggle mechanisms are vertically offset in a direction away from the associated platen, i.e., substantially below the toggle pivot for the lower platen double toggle mechanism and above the toggle pivot for the upper platen double toggle mechanism. This causes the drive link to become partially aligned with the upper (or lower) link in each link set included in the associated double toggle link mechanism. In addition the electric motor is rotated in a direction tending to raise the associated platens, so that the motor directly assists the toggle mechanisms in raising the associated platen which lowers the peak loading of the motor.

This relationship decreases the load on the electric servo motor since the motor develops a component force acting directly on the toggle link extending to the associated platen augmenting the vertical force exerted on the platen by the toggle action at a point where the toggle action is only developing a low mechanical advantage.

The crank drive for each toggle mechanism is designed to eliminate overhung loading of the crank, and the crank connection to the toggle pivotal connection. This is done by clevises at the end of the drive links and crank devises and double plate mountings of the pivots and a support bearing at the outboard end of the crank drive shaft. This minimizes bending and stressing of the connections, and the tendency of the connections to misalign or twist.

In addition, a gear box output tube is clamped to the crank drive shaft at equal distances so that shaft windup is equal to insure precisely same advance of each of the two double toggle mechanisms by the servo motor and thus an equal rise of the front and backside of the platen.

The crank arms each are connected with a clevis to one end of a drive link pivotally connected at its other end to one of the link pivots of the associated toggle mechanism by a second clevis.

DETAILED DESCRIPTION

In the following detailed description, certain specific terminology will be employed for the sake of clarity and a particular embodiment described in accordance with the requirements of 35 USC 112, but it is to he understood that the same is not intended to be limiting and should not he so construed inasmuch as the invention is capable of taking many forms and variations within the scope of the appended claims.

Figure 1:
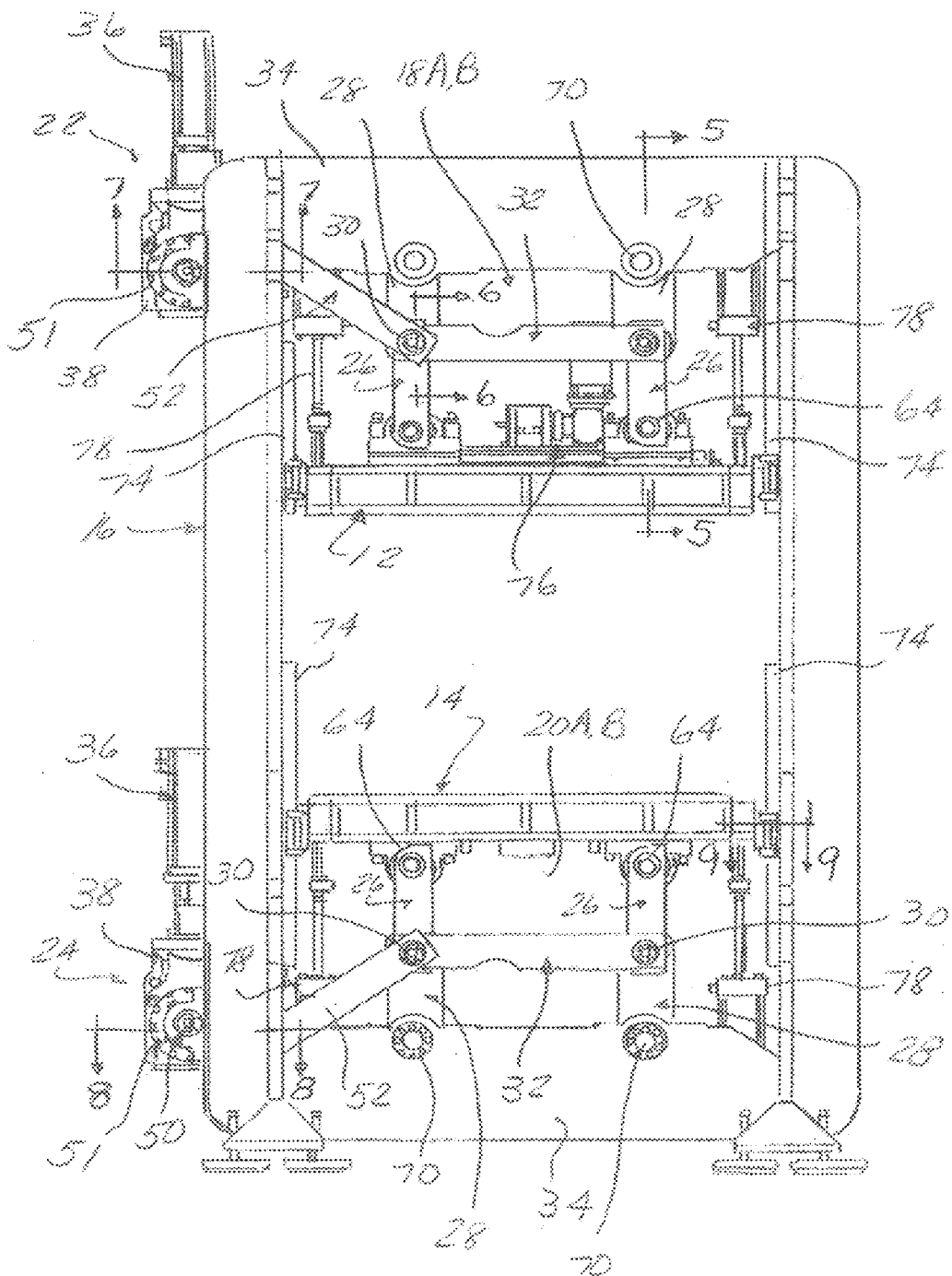
FIG. 1 is a front elevational view of a forming press having a double toggle mechanism drive for each of an upper and lower platen.
Figure 2:
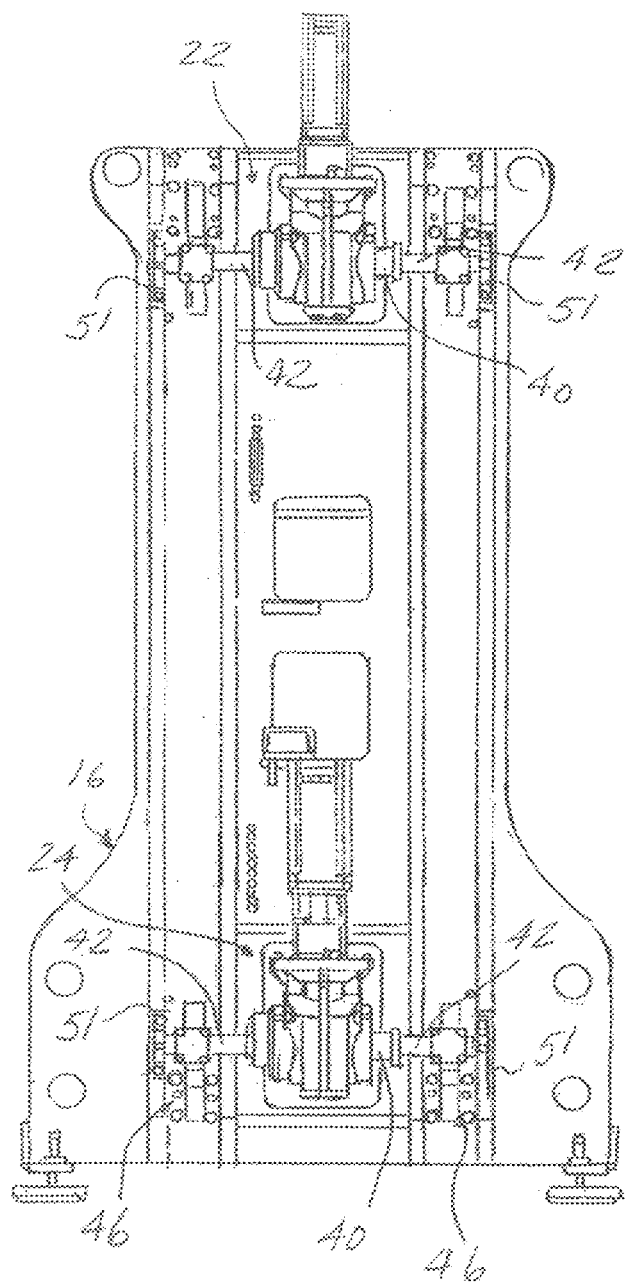
FIG. 2 is an end view of the forming press shown in FIG. 1.
Figure 3:
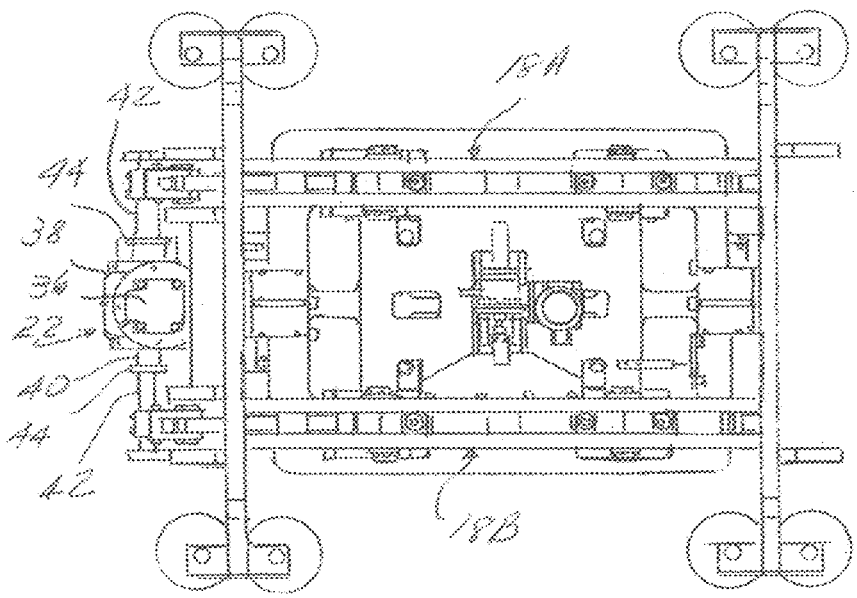
FIG. 3 is a plan view of the forming press shown in FIGS. 1 and 2.

Referring to the drawings and particularly FIGS. 1-3, a forming press 10 is shown of a type used in the forming station of a thermoforming machine. The press has an upper platen 12 and lower platen 14 mounted for vertical movement within a frame 16. Forming molds (not shown) would in use be mounted to each platen 12, 14 and driven together by the platen motion in the manner well known in the art.

The upper and lower platens 12, 14 are each driven vertically by respective pairs of double toggle mechanisms 18B, 20A, these pairs of double toggle mechanisms in turn driven by a single respective electric servo motor-gear box drive system 22, 24 for each platen 12, 14.

Figure 5:
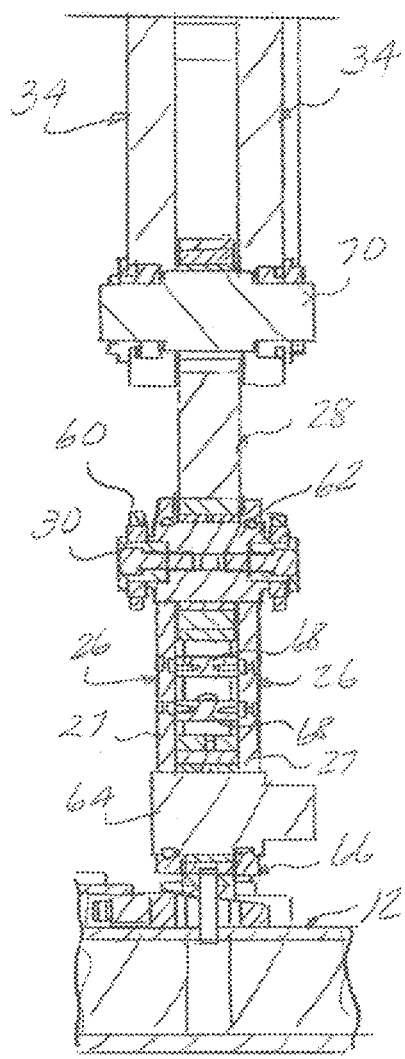
FIG. 5 is an enlarged view of the section 5-5 taken in FIG. 1.

Each double toggle mechanism 18A,B; 20A,B (FIGS. 1,4) includes a pair of first toggle links 26, each pivoted at one end to a respective upper or lower platen 12,14 and a pair of second links 28 pivoted at one end to fixed frame members 34, each link 26, 28 pivotally connected together at their other ends by a central toggle pivotal connection 30. The connected pairs of toggle links 26, 28 are also mounted to a connector link 32 also joined to pivotal connections 30 to constrain the first and second links in each pair to be parallel to each other and to constrain motion of the pairs of toggle links 26, 28 to be in unison. Each of the toggle links 26 are formed by a pair of plates 27 straddling the link 28 at the pivotal connections 30 FIG. 5.

Figure 4:
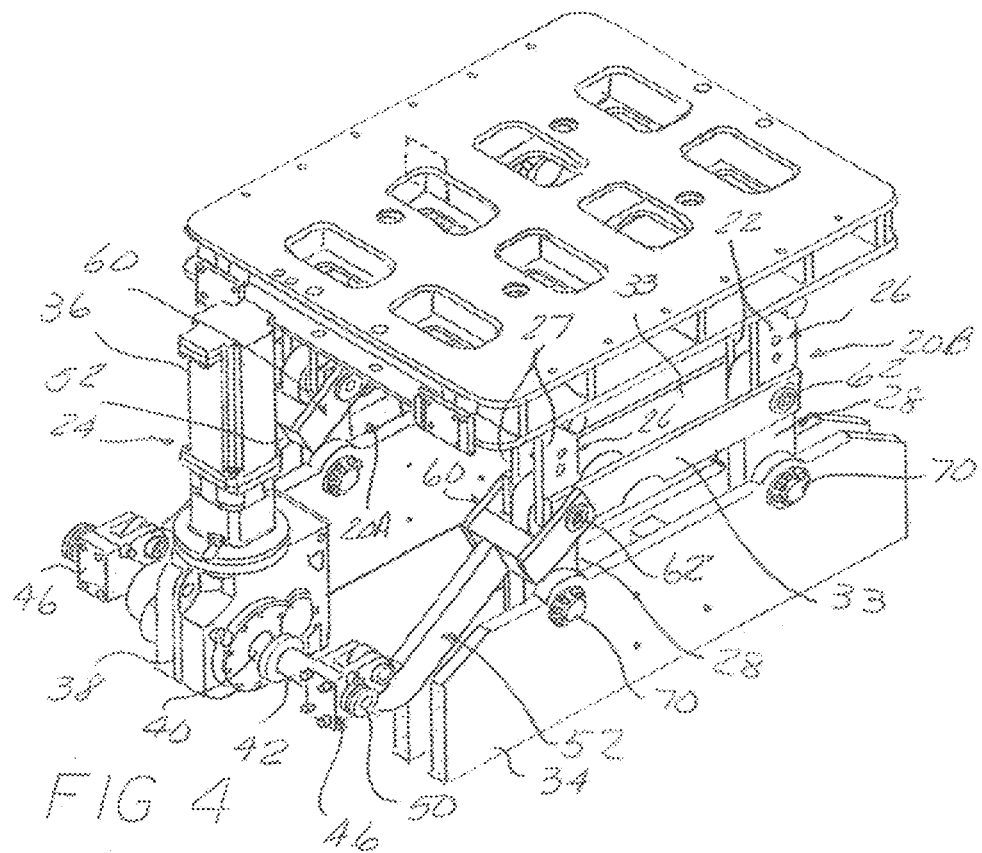
FIG. 4 is an enlarged pictorial view of the lower platen and associated double toggle mechanisms and drive system included in the forming press of FIG. 1.

The drive systems 22, 24 each include a single electric servo motor 36 for driving each platen 12,14, and also includes a gear box 38 of a type commercially available under the name SEW EURO. Each gear box 38 has a through output tube 40 projecting out opposite ends of the gear box 38 (FIG. 4). A common crank drive shaft 42 extends within the output tube 40 and projects out either end to be aligned with a respective toggle mechanism 18A, 18B or 20A, 20B. The shaft 42 is clamped to the output tubes 40 with clamps 44, each located at each end of the tube 40 to insure equal wind up of the shaft segments connected to a respective crank arm-clevis 46.

The crank arm-clevises 46 are designed to be level when assembly begins to simplify the initial set up of the components.

Figure 7:
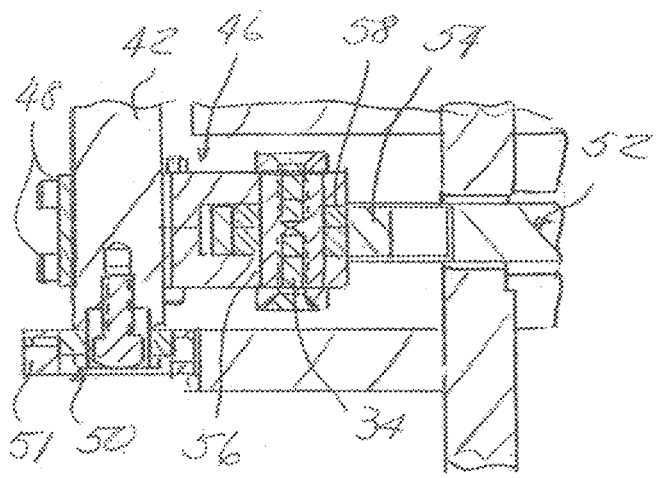
FIG. 7 is an enlarged view of the section 7-7 taken in FIG. 1.
Figure 8:
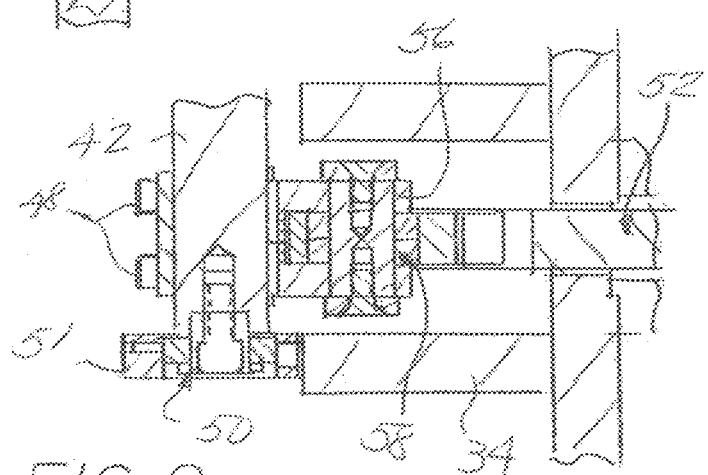
FIG. 8 is an enlarged view of the section 8-8 taken in FIG. 1.

As seen in FIGS. 7 and 8, the crank arm devises 46 are clamped to flats on the shaft 42 by screws 48 so as to exactly align both crank arm devises 46 on a respective crank drive shaft 42 and eliminate any slippage.

The opposite ends of the shaft 42 are supported by bearings 50 supported by hearing holders 51 attached to fixed frame members 34.

A toggle mechanism drive link 52 is driven by a respective crank arm clevis 46 and has a dog leg end received in a respective crank arm clevis 46 and pivotally supported on a cross pin 56 and bearing 58. The drive links 52 have a dog leg shaped end (FIG. 10) at the crank end to accommodate reversing the 150° motion of the drive shaft 42 while still being in a common plane with the crank arm 46.

According to the present invention, the axis of the drive system gear boxes output tubes 40 and shafts 42 are each located to be vertically offset from the toggle pivots in a direction away from the respective platens 12,14, i.e., in an up direction from the upper platen 12 and down direction from the lower platen 14.

This locates the drive shaft 42 and crank arm axis X (FIG. 10) to be offset substantially above the toggle pivot axes 30 for the upper platen 12 and substantially below the axis for the lower platen 14.

Figure 6:
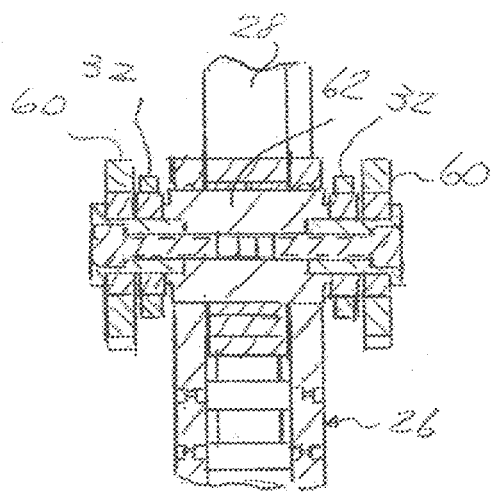
FIG. 6 is an enlarged view of the section 6-6 taken in FIG. 1.

The opposite end of each of a drive link 52 has a clevis 60 (FIG. 6) attached thereto, the opposite sides of which received over the outside of the overlapped toggle links 26, link 28, and links 32 and is pivoted thereto on a common pivot pin 62.

The links 26 are pivoted to the platens 12,14 by a pivot pin 64 (FIG. 5) held on a pivot mount assembly 66 shown attached to the platen 12 spacers 68 keep the link parts.

The links 28 are pivoted to spaced apart frame members 34 with pivot pins 70.

The motors 36 are each operated to oscillate through a 150° motion. When the bottom platen 14 is being advanced from a fully retracted position, the motor drive direction is up (counterclockwise in FIGS. 1 and 10) and towards the lower platen 14.

When the upper platen 12 is being retracted from a fully advanced position, the motor drive direction is also (counterclockwise in FIG. 1) up, but directed away from the upper platen 12. Since the crank arms 46 are vertically offset away from the platen 12, 14 there is developed a vertical component of the motion of drive links 52 acting to directly lift the respective platen 12, 14 over and above the vertical force developed by the toggle mechanisms 18, 20 which in their midrange do not develop a high mechanical advantage such that the motor load is reduced by creating a direct vertical drive by the motors.

The net effect is a reduction in the peak motor load over that which would occur if the drive link were aligned with connector link 32 and pivot connections 30.

Figure 9:
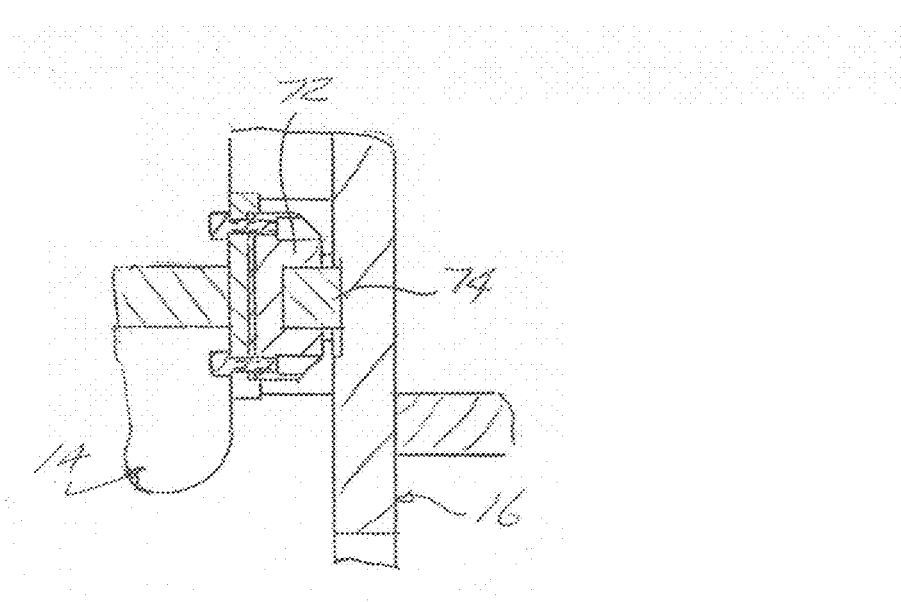
FIG. 9 is an enlarged view of the section 8-8 taken in FIG. 1.

Conventional features are not here described in detail. FIG. 9 shows linear slide bearing components 72,74 used to guide each platen 12,14 in their vertical motion on the frame 16.

A conventional shut height adjustment mechanism 76 is shown in FIG. 1 which is operated to change the relative position of the platens 12,14 in their fully advanced position to accommodate molds of different sizes.

Sets of gas springs 78 also shown in FIG. 1 are also provided which act to counteract the weight of the platens, compressed when the platens 12,14 are lowered so as to reduce the force required in raising the platens 12,14.

Figure 10:
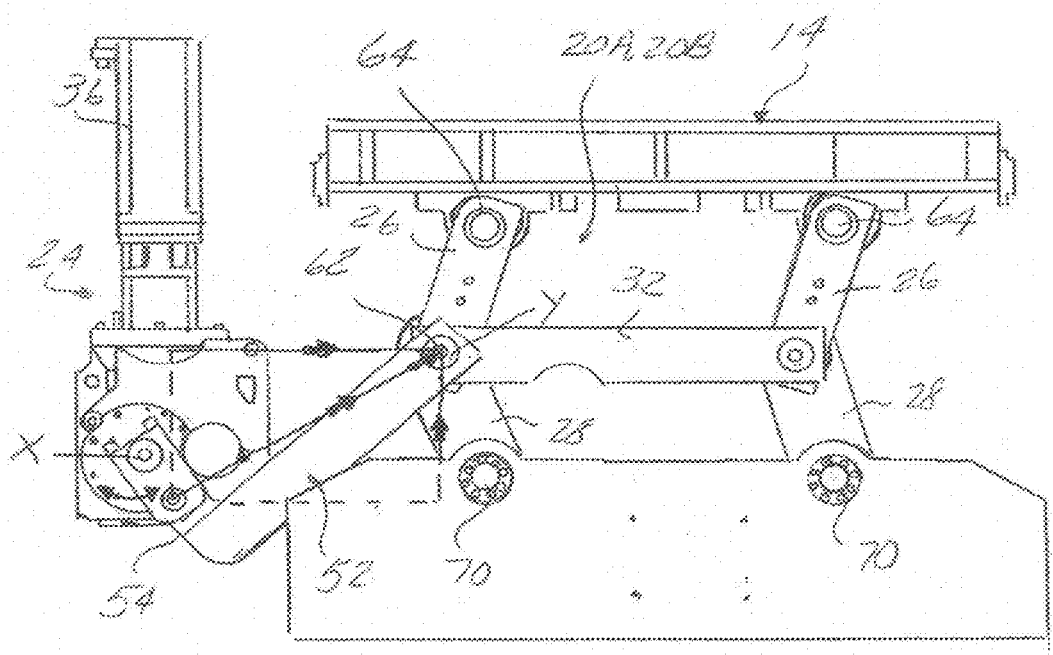
FIG. 10 is an enlarged simplified side view of the components shown in FIG. 4 with a force vector of the crank drive and link components indicated in a diagram.

In operation, the servo motors 36 are operated to oscillate the shafts through 150° of motion to raise and lower the upper and lower platens 12, 14. The lower platen motor 36 is operated to rotate its associated drive shaft 42 in a downward direction as seen in FIG. 10 when the lower platen 14 is being lowered from a fully advanced position. The upper platen motor 36 is operated to rotate its drive shaft 42 in an up direction when being raised from a fully advanced position. This drive direction arrangement reduces the peak motor load when the platens 12, 14 are being raised since a component of the force applied to the drive link 52 is directed vertically up to assist the toggle mechanism 20 as seen in FIG. 10 as to the lower platen 14, the same but inverted relationship existing with the upper platen 12. Since the toggle mechanisms 18, 20 do not exert a large mechanical advantage in their midrange motions the direct application of a lifting force component reducing the motor load. This effect is further enhanced by the location of the shaft 42 axis X substantially above the pivot axis of the upper toggle mechanism 18 and below the pivot axis Y of the toggle mechanisms 20 which causes the drive links 52 to be partially aligned with respective toggle links 26 so that the crank drives are directly acting on the links 26 to assist the toggle mechanism in raising the platens 12, 14 in addition to the toggle mechanism. Opposite relationships exist for the upper and lower platens 12, 14 and the associated double toggle mechanisms 18, 20 since the upper platen 12 is being lifted when retracted while the lower platen 14 is being lifted when being advanced.

Symmetrical loading is achieved by the single motor balanced drive to the double toggle mechanisms 18, 20 to insure stable platen motion.

The toggle pins 62. 70, 64 are also loaded symmetrically by the straddling double plate design to further stabilize platen travel.

The invention claimed is:

1. In combination with a thermoforming press having two pairs of double toggle mechanisms, each pair vertically driving a respective one of an upper or a lower platen mounted on a fixed frame, each double toggle mechanism in each pair including two first toggle links pivotally connected at one end to a respective upper or lower platen, and two second toggle links pivotally connected at one end to other end of a respective one of said first links and another end of said second links pivotally connected to said fixed frame at another end thereof, each double toggle mechanism also including a connecting link pivotally connected to both of said pivotally connected ends of said two first and second links so as to orient said two first toggle links parallel to each other as well as said two second toggle links parallel to each other;

a drive system for each of said two pairs of double toggle mechanisms each drive system including a separate drive unit for each pair of double toggle mechanisms, each drive unit having an output shaft rotated by an electric motor, a crank arm for each double toggle mechanism each crank arm having one end driven by said output shaft to be rotated thereby, and a drive link for each double toggle mechanism in each pair of double toggle mechanisms pivotally connected at one end to a respective other end of each crank arm and at an opposite end pivotally connected to a respective one of said connecting links whereat said first and second toggle links are pivotally connected together, and wherein said one of said pivotal connections between said first and second parallel links and an axis of said driving shaft are located substantially vertically offset from one another in a direction away from said respective upper or lower platen to angle said drive link towards said upper or lower platen with an upward vertical force component exerted on said platen by said output shaft through said drive link and one of said first toggle links.

2. The combination according to claim 1 wherein a double toggle mechanism in each pair of double toggle mechanisms is mounted to a respective side of said upper or lower platen and wherein said output shaft extends from either side of said drive unit to each side of said respective upper or lower platen to have opposite ends aligned with a respective double toggle mechanism on each side of a respective upper or lower platen, each end driving a respective crank arm associated with a respective double toggle mechanism; whereby said drive link of each double toggle mechanism is driven by a respective crank arm rotated by a respective end of said drive shaft.

3. The combination according to claim 1 wherein each electric motor is rotated in a direction to raise said upper or lower platen acting through a connected crank arm, connecting link, and one of said first toggle links whereby said electric motor driving said drive link upwardly assists the action of an associated double toggle mechanism in lifting said upper or lower platen.

4. The combination according to claim 1 wherein each of said first links of each double toggle mechanism includes two link plates straddling a respective second link at the point where said first and second links are pivotally connected to each other each of said connecting links of each double toggle mechanism also including two plates straddling said plates of each of said associated first links, and wherein each of said drive links including two plates at said opposite end straddling said plates of an associated connecting link whereby said pivotally connected end of each of said first and second links of each double toggle mechanisms are loaded symmetrically.

5. The combination according to claim 4 wherein said crank arms includes a clevis at said other end thereof receiving said one end of a respective associated drive link.

* * * * *

UNITED STATES PATENT AND TRADEMARK OFFICE
CERTIFICATE OF CORRECTION

PATENT NO. : 8,356,990 B2
APPLICATION NO. : 12/770203
DATED : January 22, 2013
INVENTOR(S) : Brian Keeley et al.

It is certified that error appears in the above-identified patent and that said Letters Patent is hereby corrected as shown below:

Column 1, line 30, delete "clue" and insert -- due --.

Column 3, line 50, delete "devises" and insert -- clevises --.

Column 3, line 53, delete "hearing" and insert -- bearing --.

Signed and Sealed this
Nineteenth Day of March, 2013

Teresa Stanek Rea
*Acting Director of the United States Patent and Trademark Office*